Patented Dec. 30, 1952

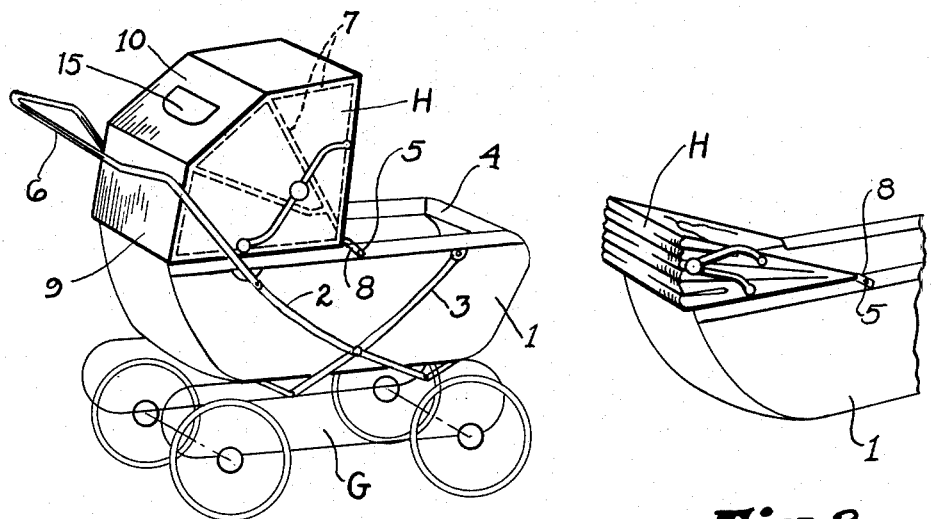
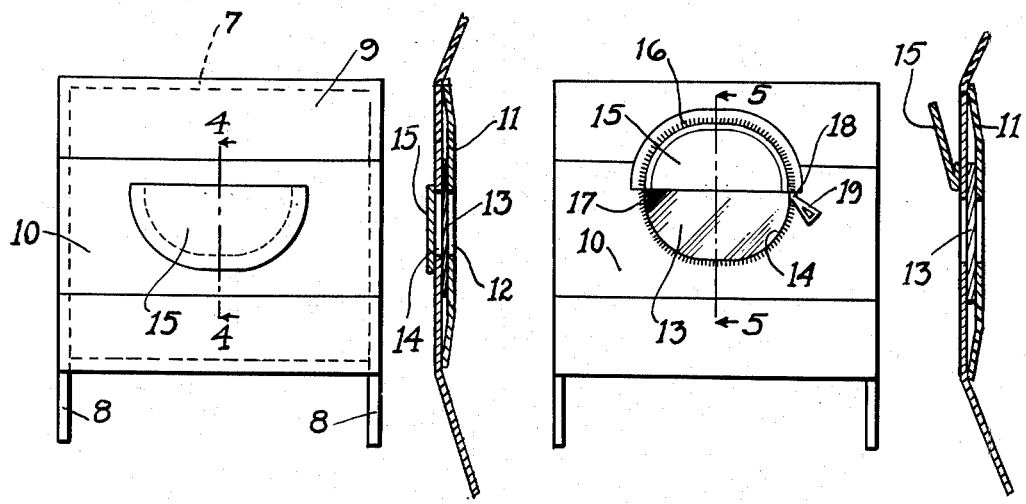

2,623,780

UNITED STATES PATENT OFFICE 2,623,780

WINDOW CONSTRUCTION FOR BABY CARRIAGE HOODS

Donald W. Siebert, Gardner, Mass., assignor to O. W. Siebert Company, Gardner, Mass., a corporation of Massachusetts Application March 14, 1950, Serial No. 149,559

1 Claim. (Cl. 296—110)

The present invention relates to children's vehicles, such as baby carriages, strollers, and the like, and has for its object to provide an improved construction for a baby carriage hood in the form of a window that is normally covered, and which can be readily opened so as to provide a view of the baby beneath the hood, without in anyway disturbing the baby if it is sleeping.

According to the present invention, the window construction is embodied in the fabric which forms part of the cover of a collapsible hood, with the window, as well as its flap, being also composed of flexible material, so that the existence of the window will not interfere in anyway with folding down the hood to its collapsed condition, or opening of the hood so as to overhang one end of the vehicle body. Furthermore, the window construction is such that it can be readily applied to standard hoods of the folding type, without substantially affecting the usual manufacturing procedure in producing such hoods.

The above and other advantageous features of the invention will hereinafter more fully appear from the following description considered in connection with the accompanying drawings, in which, Fig. 1 is a perspective view of a child's vehicle provided with a collapsible hood embodying the improved window construction.

Fig. 2 is a perspective view showing a portion of the vehicle of Fig. 1, with the hood folded down.

Fig. 3 is a view in rear elevation of the hood of Fig. 1 removed from the vehicle, and showing the window flap closed.

Fig. 4 is a vertical sectional view along the line 4—4 of Fig. 3, looking in the direction of the arrows, and on an enlarged scale.

Fig. 5 is a view in rear elevation of the hood shown in Fig. 3, with the window flap opened.

Fig. 6 is a vertical sectional view along the line 6—6 of Fig. 5, looking in the direction of the arrows, and on an enlarged scale.

Referring first to Figs. 1 and 2 of the drawings, the improved window construction of the present invention is shown for purposes of illustration, as being applied to a baby carriage of the folding type, although obviously the invention is capable of use in connection with any other type of baby carriage provided with a collapsible hood. Such a baby carriage generally comprises a body 1 supported between pairs of side members 2 and 3, which extend below the body 1 for connection to the frame of the running gear G, which is shown diagrammatically, and is of conventional construction. The vehicle is provided with a hood assembly indicated at H, which is connected to the frame 4 of the body 1 by pivots 5, so that the hood H can be swung with relation to the pusher bar 6, so as to overhang either end of the body 1.

The hood H provides a collapsible frame consisting of a number of bows 7 which are indicated in dotted lines in Fig. 1 as being pivotally connected together at their ends, with the arms 8 of one outside bow 7 being extended beyond the hood for connection to the pivot 5. The frame provided by the bows 7 serves to support a cover 9 preferably composed of flexible water proof fabric, and when the hood is extended, as shown in Fig. 1, it forms a number of relatively flat panels 10.

As previously pointed out, the object of the present invention is to provide an improved window construction for the hood of a child's vehicle, and this construction is shown as being applied to the central panel 10 of the hood H. As best shown in Figs. 3 and 4, the window construction consists of a liner 11 applied to the inside of the central panel 10, with the liner 11 providing a window opening 12 covered by a sheet 13 of flexible transparent material, such as Celluloid, or a suitable plastic. The material forming the central panel 10 of the hood cover 9 provides an opening 14 in register with the window opening 12 of the liner 11, and this opening 14 is adapted to be closed by a flap 15, one side of which is secured to the upper edge of the opening 14.

The flap 15 is shown in its closed position in Fig. 3 and in its open position in Fig. 5, wherein the flap has been raised so as to expose the sheet 13 of transparent material, thereby giving a view through the window opening 12 to the interior of the hood H. In order that the flap 15 may be held down when the window is not in use, the inner margin of the flap 15 is provided with a series of slide fastener elements 16, and the edge of the opening 14 in the panel 10 is provided with a similar series of slide fastener elements 17. These fastener elements 16 and 17, are of conventional construction, and cooperate with a locking slide 18 having a pull tab 19, so that the flap 15 will be securely held in position in front of the window when the slide 18 occupies the position of Fig. 3. In Fig. 5, the slide 18 is shown as having been moved to the other side of the opening 14, so as to permit the flap 15 to be turned upwardly, about the side secured to the panel 10 which serves as a hinge, and thereby expose the window opening 12 in the liner 11 and its transparent cover sheet 13.

Since all parts of the window construction, including the liner 11, the sheet 13, and the flap 15, are composed of flexible material, the hood H can be folded downwardly in the collapsed position of Fig. 2, without the window construction in anyway interferring with the normal use of the hood. Furthermore, the fact that the window construction is incorporated in the middle hood panel 10, insures that the window will be effective to provide a view of the occupant of the vehicle in either position of the hood H, which as previously noted, can be applied to any type of baby carriage body.

I claim:

A window construction for the hood of a child's vehicle, comprising in combination, a hood frame composed of spaced bows for supporting a cover of flexible material, in a series of flat panels, a window opening formed in one panel of said cover, a liner attached to the inside of said cover panel and carrying a sheet of flexible transparent material, in register with said cover opening, and a flap of flexible material hinged along one side of said opening and detachably secured around the outside margin of the remainder of said opening.

DONALD W. SIEBERT.

REFERENCES CITED

The following references are of record in the file of this patent:

UNITED STATES PATENTS

| Number | Name | Date |
|---|---|---|
| 922,069 | Walsh | May 18, 1909 |
| 1,770,841 | Clyman | July 15, 1930 |
| 1,884,190 | Perlmutter | Oct. 25, 1932 |
| 2,191,005 | Wylie | Feb. 20, 1940 |